Nov. 15, 1955  A. J. HORNFECK  2,724,082
MOTOR REGULATING SYSTEM FOR FLUID LEVEL CONTROL
Filed Nov. 2, 1951  3 Sheets-Sheet 1

INVENTOR.
ANTHONY J. HORNFECK
BY
*Raymond W. Jenkins*
ATTORNEY

INVENTOR.
ANTHONY J HORNFECK
BY
Raymond D. Jenkins
ATTORNEY

Nov. 15, 1955     A. J. HORNFECK     2,724,082
MOTOR REGULATING SYSTEM FOR FLUID LEVEL CONTROL
Filed Nov. 2, 1951     3 Sheets-Sheet 3

*INVENTOR.*
ANTHONY J. HORNFECK
BY
Raymond W. Junkins
*ATTORNEY*

United States Patent Office 2,724,082
Patented Nov. 15, 1955

2,724,082

MOTOR REGULATING SYSTEM FOR FLUID LEVEL CONTROL

Anthony J. Hornfeck, Lyndhurst, Ohio, assignor to Bailey Meter Company, a corporation of Delaware Application November 2, 1951, Serial No. 254,615

13 Claims. (Cl. 318—482)

My invention is directed to control systems which position a regulator, or control element, through a series of effects delivered in pulses so as to "step" or "jog" the controlled element in the direction of correction.

A condition, quantity, quality, position or other variable may be continuously and instantaneously measured by well-known apparatus. The measurement so obtained may be used to effect a control of the same or of another variable which may, or may not, contribute to the magnitude, or change in magnitude, of the variable being measured. Representative of variable quantities, conditions and the like to which my invention is directed are such variables as rate of fluid flow, temperature, liquid level, and pressure; although the variable may equally as well be the position in space of an object, the throttling position of a valve, or the like.

In the well-established class of control systems to which I direct my invention there is absent any practical tie-back between the control element and condition due to distance, complexity of the measuring system, or simply lack of equipment. It is to solve the problem of control under these conditions that I have devised a system wherein the control element is positioned in the direction of correction in a series of steps, or jogs, whose lengths depend on the instantaneous magnitude of the deviation of the condition from its predetermined value.

An object of my invention is, therefore, to correct the condition by regulation in a series of increments whose length is dependent upon the deviation of the condition from a predetermined value.

Another object of my invention is to maintain a condition at a predetermined value solely through bilateral control of the regulator.

Another object of my invention is to correct a condition by positioning a regulator with a series of control impulses which decrease in length as the regulator nears the desired new position.

Still another object of my invention is to modulate regulator corrective action in either of two directions so the action is broken up into impulses of varying length over the time-span of corrective action.

I have shown my invention as specifically embodied in a hydro-electric plant system which has three stations, each with a turbo-generator unit. The flow of water to each station and the tail-bay (or reservoir), as well as level at all but the last station, are the factors utilized by this specific embodiment, with the flow only to the last station being used because the water is delivered directly to the lowest level as a substantially limitless reservoir.

Direct measurements are made of the flow and level factors at the two stations I have disclosed and their linear variations from desired values are combined into a single signal for ready comparison to a cycling signal, for step-action control of a valve which proportions the water through the turbine to the water by-passing the turbine, or other governor, or to a controller which returns the combination-condition of flow and level to desired values or interrelation.

Figure 1:
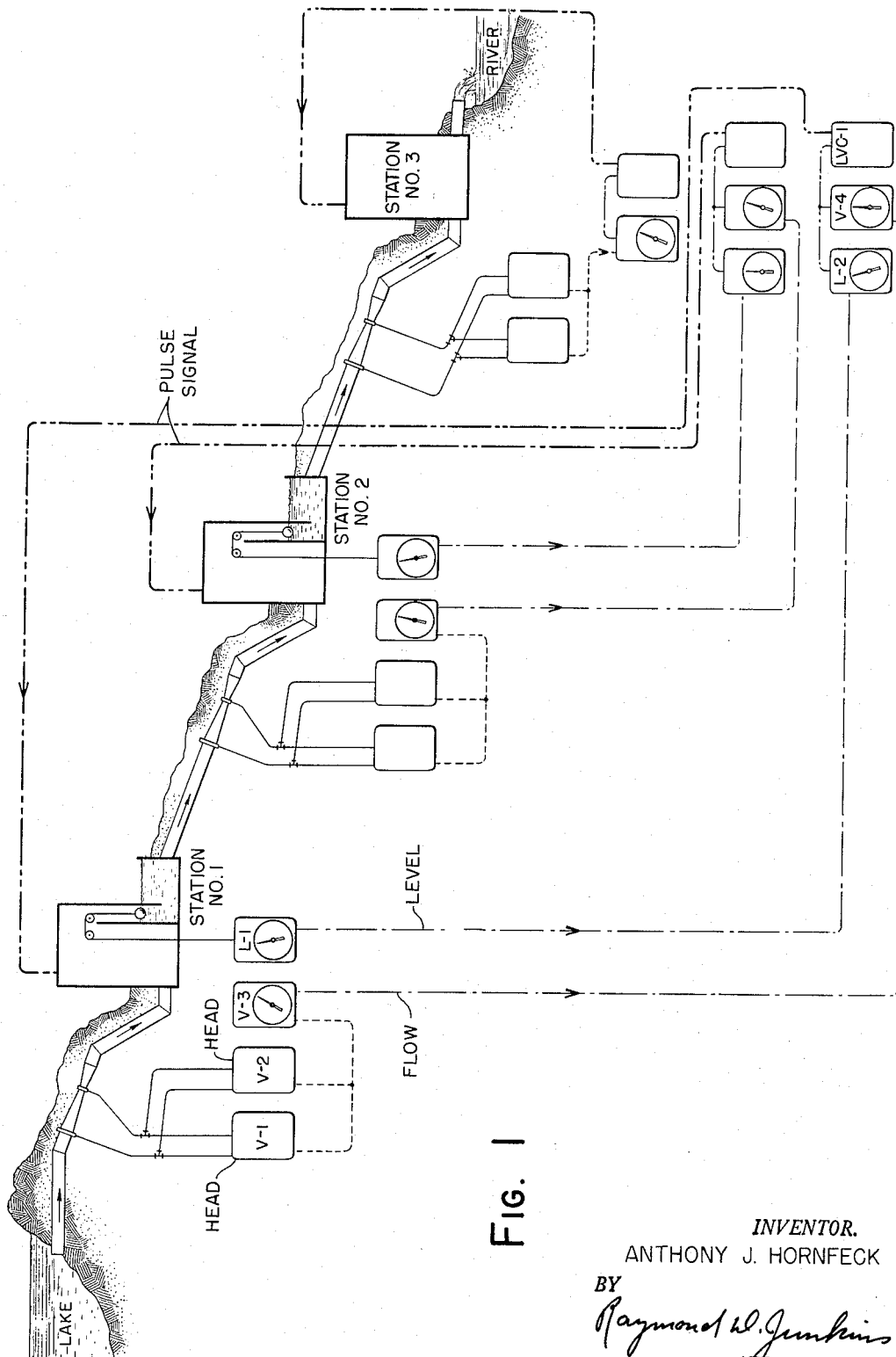
Fig. 1 is a schematic showing of a hydro-electric plant system utilizing a control system of the type in which my invention is embodied.

Fig. 1 represents the over-all relation between stations and the measuring points of the factors utilized in this particular embodiment. The three stations are connected by a closed conduit carrying the water driving the turbines. Other chambers and structure are obviously necessary to accommodate the water of a system as large and extensive as this one represents; however, I have deemed it unnecessary to show more than diagrammatic representations of means to sense the factors my invention utilizes in positioning a controller towards increasing or decreasing the magnitude of the factors.

Grouped near the representation of each station is a set of instruments for making the measurements and transmitting them to a central control point at or near the last station where there is established the control impulse which is then conveyed back to the particular station having the controller requiring adjustment.

To exemplify the possibly desirous provision of a plurality of ranges for one or more of the variables employed for my invention, I show V–1 and V–2 as instruments responsive to the differential pressure of the Venturi restriction just ahead of station No. 1. Whichever instrument, V–1 or V–2, is employed, its impulse is linearly established in V–3 and telemetered to V–4, located at the central control station, arbitrarily situated at or near station No. 3.

The level of the water discharged into the tail-bay of the turbine prior to transmittal to station No. 2 is measured by L–1. This is inherently a linear measurement which is telemetered directly from L–1 to L–2 at station No. 3 without further calculation, conversion or translation.

At station No. 3 the measurements of L–2 and V–4 are combined and compared with a cyclic-modifying signal, in LVC–1 for control of the relay sending the impulse, characteristic of my invention, back to station No. 1 for regulating the turbine by-pass valve, controlling the governor to the turbine, or whatever the particular installation requires for properly altering the factors utilized.

The type of control embodying my invention is supplied other stations, represented by station No. 2, along the conduit between station No. 1 and the control point at or near station No. 3. The final station No. 3 is represented as not having the plurality of factors found at the preceding stations because the need for a control of level at its discharge point is absent; here the specific example of an arrangement whereby one of the factors is unnecessary is the location of station No. 3 on the river into which it finally discharges the water.

While the basic novelty of my system and structure may be said to be duplicated at each of the stations along the water conduit, the entire procedure of regulating the water conveyed from the elevated lake to the river, while converting it to electric power at spaced stations, can be held in the view of being a novel combination with a unitary result accomplished in this unique manner.

Proceeding to the more specifically novel structure of my invention, I will explain in detail how the variables at station No. 1 are measured, telemetered to the control point of station No. 3 and modulated into a control effect, or pulse signal, for return-telemetering to a regulator at station No. 1. The great distances encountered in the installations of this nature, and/or lack of equipment, may well limit the possibility of gearing the regulator directly to the means thrown out of balance by departure of the conditions from a predetermined, or set point, value. Therefore, as outlined previously, I have devised this system of control to produce a series of pulses whose lengths are dependent on the magnitude of the departure of the factor, or combination of factors, from a predetermined total value. The control system "steps" the regulator, or control element, in the direction of correction; and as the desired position is approached, the condition will be approaching its set-point value. It is comparatively easy to time the response of the regulator to its positional impulses to the condition response to the regulator so they will approach the desired position and magnitude together.

Figure 2:
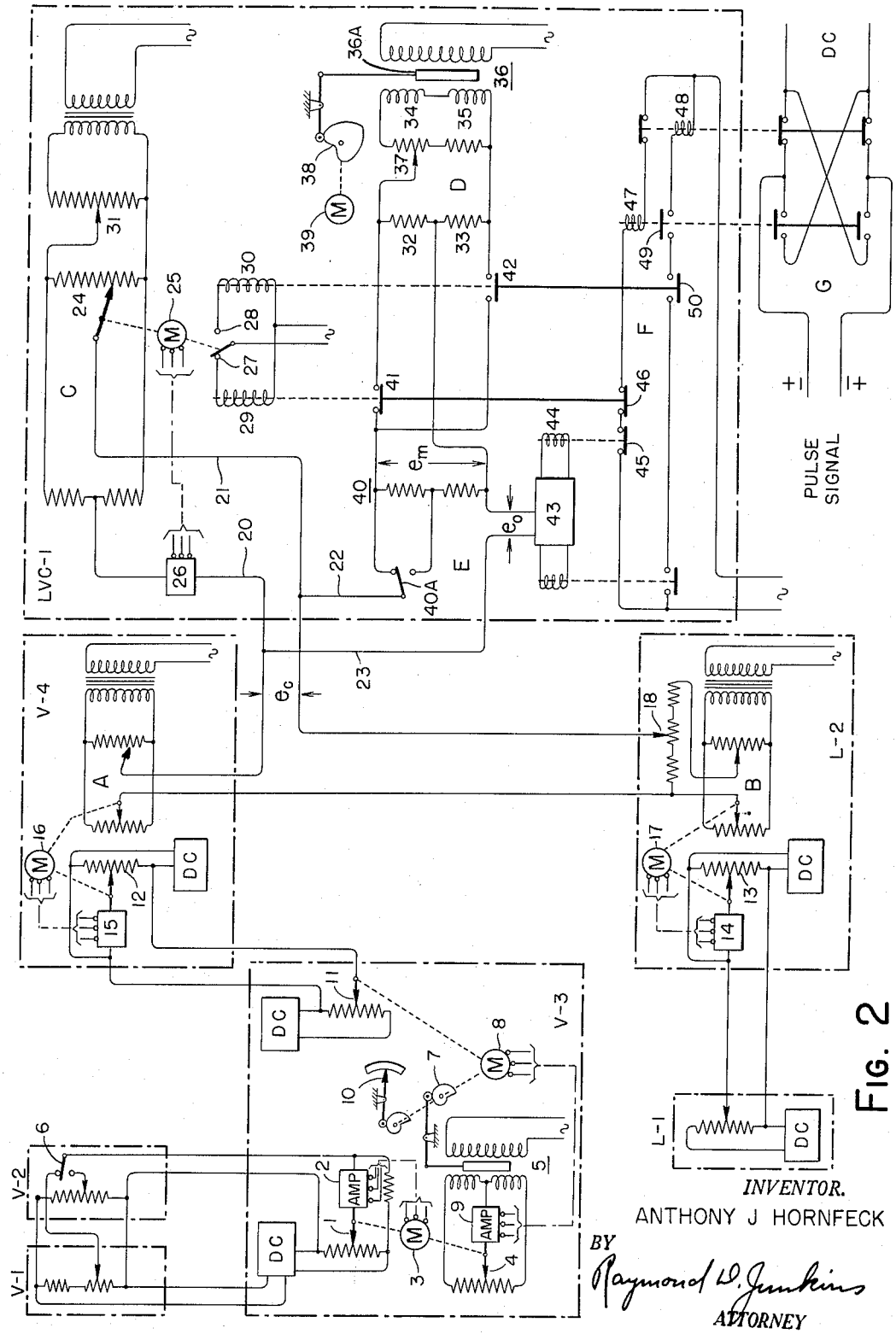
Fig. 2 is a part of the complete control system embodying my invention.

In Fig. 2 I have disclosed, diagrammatically, the essential structure which embodies my invention in each of the instruments V–1, V–2, V–3, V–4, L–1 and LVC–1 of Fig. 1. Designation of distances between these instruments at their various stations is not indicated, but the essential lines for telemetering the measurements and impulses are clearly designated as giving the desired cooperation between the system components.

The metering components of V–1 and V–2 are not represented, but a potentiometer is shown as positioned in accordance with the differential of each meter. A conventional, phase-sensitive amplifying device 2 is included in the measuring bridge for control of motor 3 which drives to balance the flow responsive bridge by positioning a potentiometer 1 while simultaneously positioning another potentiometer 4 which forms a Wheatstone bridge relationship with the secondaries of a movable core transformer 5.

It is to gain sensitivity that the differential-responsive potentiometers of V–1 and V–2 are selectively placed in the measuring circuit for flow. The possibility is, therefore, that for perhaps the first 30% of the full range of the flow variable, the complete V–1 slidewire is utilized for the gain of a large unbalance for small changes over this percentage of the range. As the V–1 slidewire approaches its maximum value, a mechanically actuated switch 6 substitutes the potentiometer of V–2 which has, meanwhile, been positioned only 30% of its full motion which covers the complete flow range. Specific operating conditions encountered will determine the exact percentage of the range of potentiometer of V–1 should cover for needed sensitivity of response.

The core of movable core transformer 5 is positioned by a square root cam 7 controlled by a motor 8 under the direction of phase-sensitive device 9 in the Wheatstone bridge including 4 and the secondaries of 5. With the core 5 being positioned in accordance with the square root relation between differential pressure and flow, motor 8 actually moves in linear response to flow and may position an indicator 10 by means of a uniform-rise cam. Also, with a linear motion now available by means of motor 8, a potentiometer 11 can be positioned for telemetering the flow value to V–4, located at the control point at or near station No. 3.

V–4 and L–2 are quite similar in arrangement and function. Potentiometers 12 and 13, in these instruments, are both linearly positioned in accordance with the variables telemetered by their respective, incorporating Wheatstone bridges. The use of a device similar to V–3 is obviously not necessary between L–1 and the level primary element as float-measurement of level is inherently linear. By the use of phase sensitive devices 14 and 15 and motors 16 and 17 a positioning is made available in V–4 and L–2 in accordance with the linear variation of two variables, flow of the water to the station and level of the water discharged into the turbine tail-bay.

In V–4 and L–2 I have placed control bridges A and B which are unbalanced by motors 16 and 17 in accordance with the variables with respect to standards or set points, manually established. Bridges A and B each include two potentiometers, one of which is positioned by either motor 16 or motor 17 and the other of which is manually adjustable for determining the set point.

It may be desirable to vary the ratio of contribution made by the unbalance of either bridge to the total signal. I have provided, in L–2, a potentiometer 18 across the output of bridge B to disclose means for varying the total signal by suppression of the contribution, to the sum of the bridge unbalances, made by bridge B. The outputs of bridges A and B are placed in series so their voltage output, upon the appearance of error, is the algebraic sum of the unbalance of A and that portion of B preset across potentiometer 18. Therefore, there is available for LVC–1 a voltage proportional to the sum of errors appearing in the condition at station No. 1 which can be reduced by positioning a regulator, or control element, which returns the condition to its predetermined value.

How the total error signal is produced should now be clear. It is specifically disclosed here as either the unbalance potential of a bridge such as A or B or of one such bridge alone. Additionally, if a plurality of error potentials are utilized to make up a total error signal, one or more of them may be shunted by a structure similar to potentiometer 18 to proportion the contributions of each error potential source to the single, total potential produced for application to the regulator of the agent which tends to return the condition to the desired value.

With the foregoing generalizations simple and clear, it will next be understood that I apply the total error potential to two separate networks in parallel. This relation is made apparent by tracing the conductor pairs 20, 21 and 22, 23 into bridge C and a comparing network E. Bridge C is an elemental form of balanceable network including potentiometer 24 positionable by motor 25 under the direction of phase-sensitive device 26 in the conjugate conductor of the bridge as formed by 20, 21. Comparing, or relay, network E is directly controlling an impulse relay by a composite potential formed of the total potential being compared to a modifying potential originating in network D. Modulating network D is essentially a shunted movable core transformer 36 but with features which render it more adequately described as a modifying network under control of bridge C while superimposing its modifying potential on the total error potential in circuit E. The specific cooperation between C, D and E to produce an impulse in accordance with the magnitude and direction of the deviation of the condition from a predetermined value will subsequently appear.

The critical analyst will ask why the final regulator (by-pass valve or turbine governor at the station) is not directly geared to the motor 25 of bridge C. However, although proportional control would theoretically result in positioning the regulator, hunting, or cycling, would be certain in a system of the size contemplated because of the lag between regulator movement and condition response. A solution to this cycling problem might then be sought in opposing the conditional unbalance of bridge C by an effect produced in accordance with regulator movement or rate of movement change so there will be no overshooting of the desired regulator position with consequent hunting or cycling. But there is quite often a very real limitation in equipment or transmission lines for telemetering the regulator movement impulse back to a bridge such as C. Therefore, the present control system was conceived to "step" or "jog" the regulator in the direction of correction with the periodic impulses decreasing in length as the corrective regulator position is approached. Specifically, my system determines the closure and open periods for contacts between a D.-C. power supply and a regulator to be driven by that supply.

Bridge C is more aptly described as a deviation bridge because, upon an unbalance appearing, due to the total error voltage appearance of a predetermined magnitude, movement of motor 25 in one direction or the other closes contact 27 or 28 for energization of solenoid 29 or 30. The magnitude of the error voltage needed to cause motor 25 to close either contact 27 or 28 may be adjusted in one, or both, of two ways. The dead-band, as it is commonly referred to, may be adjusted by manipulating the entire energization of bridge C through potentiometer 31 or the mechanical setting of the mechanism of contacts 27 and 28. This is another example of the multiplicity of sensitivity adjustments throughout my control system which render it extremely flexible to the myriad of problems encountered in timing the extensive systems of the nature I specifically disclose.

Going now to modulator D, I wish to first emphasize its basic nature as a shunted movable core transformer with secondary windings 34, 35, having a potential induced in them which is placed across resistance pairs 32, 33 through potentiometer 37. Potentiometer 37 determines the maximum potential across 32, 33 by manual adjustment. With the basic magnitude of the output of modulator D adjustable through potentiometer 37, the movable core transformer 36 makes it possible to produce an A.-C. voltage that varies linearly in magnitude with respect to time. Through the agency of motor 39 continuously driving linear-rise cam 38, the core of 36 is reciprocated from the mid-point of secondaries 34, 35 to one end for giving an A.-C. potential output for modulator D that starts from zero, increases to a maximum and then reduces to zero again and once more increases, always remaining in the same phase relation with respect to the primary voltage.

The phase of the voltage output of modulator D is then determined, by my circuit arrangement, across the resistance set at 40 through either contact 41 or 42. It is apparent that the phase of the voltage across the resistance set at 40 is reversed in phase 180° when going through contact 41 or when through contact 42. It can now be recalled that the direction of deviation from balance creating the error voltage is indicated by motor 25 which correspondingly actuated either contact 27 or 28. Therefore, through consequent closure of either contact 41 or 42, the phase of the voltage output of modulator D is maintained 180° out of phase with the error voltage compared to it in relay circuit E.

Again, with resistance set 40, I have indicated another structure 40A for altering the sensitivity of response given by my control system. The basic magnitude of the composite potential within network E may be materially, and selectively, reduced by the switching arrangement disclosed. The arrangement, essentially, allows the manipulation of the resistance of the relay 43 input circuit and the consequent sensitivity of network E.

The purpose of the modulating potential of D, injected in series but bucking the error potential, is to break the total error signal into pulses, the length of each pulse being proportional to the magnitude of the error. In the case of zero error voltage the relay 43 actuates neither of its switch coils and the deviation direction control contacts 27, 28 are both open. Thus, there will be no modulating voltage injected into the circuit of relay 43 and the input to it will be zero. I have actually shown the condition where the error voltage increases sufficiently to close contact 27. Solenoid 29 is energized by the line voltage supplied upon the closure of contact 27. The relay coil 44 is energized by relay 43 and contact 45 is closed. Contact 46 is simultaneously closed, with 41, because of the mechanical connection between them. A circuit is completed between an energy source and solenoid 47 whose activation connects the D.-C. power source to the regulator of the agent through the disclosed contacts.

The divided, directional-impulse circuit F is entitled to a full share of attention at least because its system of interlocks insures against transient effects and results in positive signals being transmitted in the proper direction. Essentially F provides for completion of one of two possible circuits at a time. The purpose of the entire circuit is to actuate either solenoid 47 or solenoid 48 by means of a power source. The important feature at this point is the contacts 46 and 50 lying in the opposite half of the circuit F from their respective relays; this arrangement insures that when relay 29 or 30 is actuated and one half of circuit F is thereby basically completed, the subsequent activation of relay 47 or 48 opens the other half of F to prevent relay 47 and 48 being activated at the same time. The D.-C. power circuit G is therefore connected to the regulator in one polarity or the other by relay 47 or relay 48 by the disclosed pairs of contacts.

I now wish to render a detailed description of how the coil of relay 43, selected directionally, has its "on-time" proportioned to its "off-time" in accordance with the magnitude of the deviation of the condition from a predetermined set-point. The terminology I will employ is most adequately related to structure by generalizing that I modify the measuring unbalance potential $e_c$ by a modulating potential $e_m$ that their algebraic sum $e_o$ may be applied as a composite or combined potential to the relay 43. Another way of stating the relation is to maintain that a periodically cycling signal $e_m$ is introduced in series, or superimposed, with the measuring signal $e_c$; the resultant signal, equal to $e_m - e_c$, is applied through electronic relay 43 to the on-off impulsing of a controller.

The device I specifically employ to produce $e_m$ is the unbalance voltage of network D including the secondary windings 34, 35 of movable core transformer 36. I synchronously reciprocate the core of 36, by a cam 38-motor 39 arrangement. The general teaching in this control art recommends a minimum frequency several times as great as the natural frequency of the hunting of the control system. This is a matter of unavoidable experimentation with the individual system as well as the determination of the maximum value of the fluctuating potential determined by adjustment of the shunting potentiometer 37. However, I do travel the core reciprocation from the mid-point of the bucking secondaries to one end of one of the coils to give an A.-C. potential from this unit which will maintain a constant phase-relation with the potential of the primary coil throughout its reciprocation.

Figure 3:
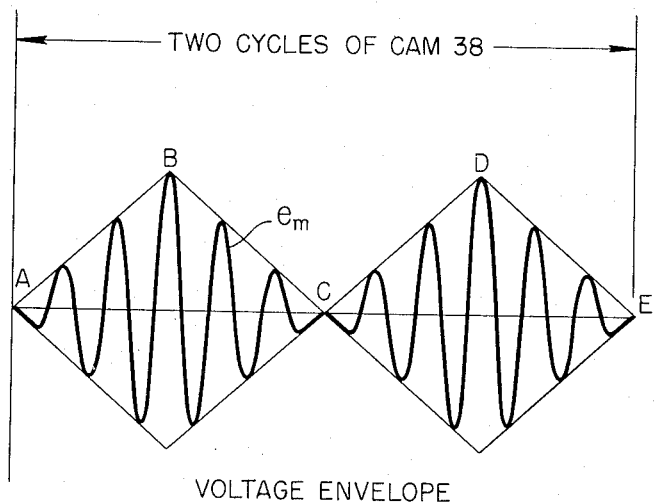
Figs. 3 and 4 are graphs of electrical characteristics in connection with Fig. 2.

Fig. 3 depicts a typical voltage envelope for the signal $e_m$ for two complete cycles of the cam 38, i. e. for two complete reciprocation cycles of the core 36A coupling the energized primary winding with the bucking secondary windings 34, 35. Assume that the core 36A is at exactly the inductive mid-point of the windings corresponding to A (Fig. 3), the unbalance voltage is zero ($e_m=0$). As the core moves away from neutral (A toward B in Fig. 3) a 60 cycle A.-C. voltage $e_m$ is developed, growing at a uniform rate from zero at A to a maximum at B, and of the phase determined by the connections of transformer coils 34 and 35. As the core reverses its direction of motion and moves back toward neutral position the in-phase voltage $e_m$ decays to zero (B to C). It will be appreciated that the curves drawn within the envelope A—B—C of Fig. 3 are representative only and are a part only of the actual 60 cycle current alternations in the full cycle of cam 38.

As the core 36A reaches the neutral point the signal $e_m$ decreases to zero in magnitude (C). Then, as the core reverses direction, the voltage $e_m$ again grows, along C—D, in duplication of A—B, both in phase and magnitude. As the core again reverses its direction of motion and moves back toward neutral position the voltage $e_m$ decays to zero along D—E, exactly as done along B—C.

Figure 4:
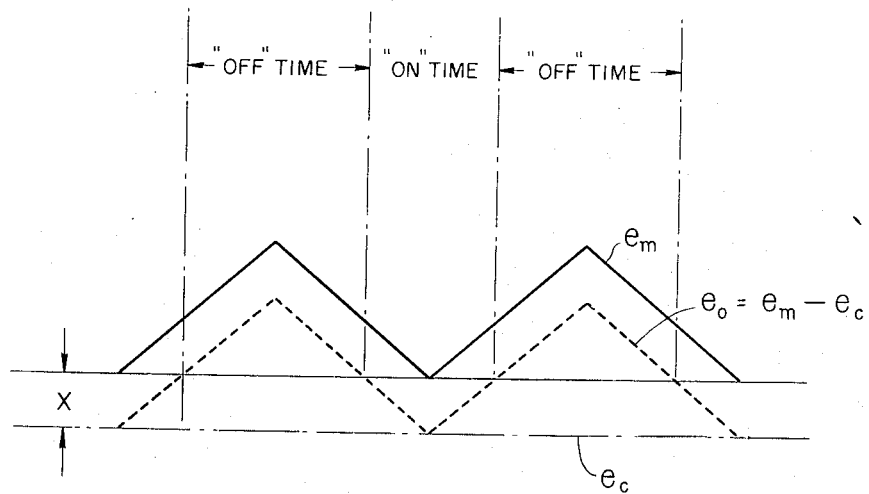

With potential $e_m$ clearly illustrated, I have attempted to solve the problem of representing the combined, or composite, action given relay 43 by $e_o$, as controlled by deviation bridge C. I feel that Fig. 4 is an adequate representation of the function of the structure if certain qualifications are maintained. I have assumed a condition deviation to have exceeded the dead-band and motor 25 to have energized solenoid 29 by closing contact 27. Contact 41 is closed and the phase of $e_m$ is insured to be opposite from $e_c$ in the circuit of relay 43. Graphically, in Fig. 4, I have shown as a solid line in triangular wave shape above a base line for depiction of the R. M. S. value of $e_m$. Although $e_c$ is an A.-C. potential I have assumed its R. M. S. value is uniformly X below the base line.

The resultant potential of $e_m$ above a base line and $e_c$ below the base line is $e_0 = e_m - e_c$. Graphically, the resultant voltage $e_0$ is depicted by the broken line lying across the base line. The potential $e_0$ changes its phase as it crosses the base line and the proportion of each cycle below the base line is dependent solely on the magnitude X of $e_c$, the measuring unbalance produced by deviation of the condition from its set-point.

Relay 43 is a relatively elementary, phase-sensitive device which will operate one coil when energized by a potential of one phase and another coil upon reversal of phase. With the circuit of relay 43 supplied $e_0$ as a potential, one coil will be operated during the part of the cycle $e_0$ is above the zero or base line, and the other coil will be operated during the remainder of the cycle $e_0$ is below the zero or base line. As one coil will be off while the other is operated, Fig. 4 has been used to show the "off-time" of one coil in relation to its "on-time." It is simple to reason how the proportions of these time intervals are hereby made a direct, positive function of the magnitude of the deviation of the condition.

Of course when coil 44 is off the other coil of relay 43 is on and vice versa, however, relay 29 has not only insured an opposite phase relation between $e_m$ and $e_c$ by closure of contact 41 but has simultaneously closed contact 46 to insure that the circuit of solenoid 47 only will be made and broken in deviation pulses by contact 45. The divided, directional-impulse circuit F is thereby given a directional control by motor 25 actuating solenoid 29 and a deviational impulse control by actuation of coil 44.

The final result achieved by the cooperation heretofore described between C, D, E and F is that either solenoid 47 or 48 of circuit F is energized in pulses whose lengths correspond to the magnitude of the deviation of the condition from a predetermined value. The regulator is, therefore, actuated in the direction of correction, not continuously, but in "steps" or "jogs" commensurate with the pulse lengths. The positional response of the regulator to these pulses is easily adjusted by conventional means so that as the new position is approached the condition is returning to its desired value. The new regulator position is then attained, and the error signal reduces to within dead-band limits, asymptotically. A control system is hereby evolved which has no pilot motor given directional impulses, alternatively, with their standard, or length, predominate in a desired direction. Here the final control element, indeed every component of the system, with the exception of the modulator D, is given no energization at all until an error signal indicates a condition deviation. Then the actuation of the proper directional solenoid, 47 or 48, insures the regulator receiving a series of impulses in one direction only. Vibratory response of the final control element, or of any component of the system, is thereby avoided with all the consequent advantages of reduced mechanical wear and unutilized periods of energization.

It is to be clearly understood that the concepts of inventive cooperation that I have embodied in the structure specifically disclosed may be embodied in other conceivable forms limited and defined only by terms of the appended claims.

What I claim as new, and desire to secure by Letters Patent of the United States, is:

1. A control system for a condition including in combination, an agent supply for altering the condition, a regulator for the agent supply, a balanceable network responsive to the condition magnitude, a balanceable network responsive to the direction of deviation of the condition network unbalance, a relay network producing a relay action under the direction of the condition network, a modulating network for producing a constant base signal for comparison with the magnitude network output in the relay network under direction of the deviation network, a divided directional circuit whose divisions are selectively actuated by the deviation network with the selected division periodically actuated by the relay action, and a power network controlled in its application to the regulator by the actuated portion of the divided directional circuit.

2. A control system for a condition including in combination, a condition regulator, a power supply circuit for the regulator, a direction-impulse circuit for connecting the power supply circuit to the regulator, a relay circuit for giving impulse activation to the direction-impulse circuit, a modulating circuit for supplying a fixed set of comparing values to the relay circuit, a deviation network selectively activating directional portions of the direction-impulse circuit and controlling the character of the comparing values supplied the relay circuit, and a balanceable network controlling the deviation network in its selection and control while supplying the relay circuit with magnitude values for comparison with those of the modulating circuit.

3. A system for control of a condition including in combination, variable supply means influencing the condition, means for controlling the variable supply means, a network unbalanced by the condition, a combining circuit responsive to the network unbalance, a phase-sensitive means in the combining circuit for actuating the means controlling the variable supply means, means to produce an alternating current signal potential periodically cycling at a slow rate between zero and a maximum while maintaining a constant phase relation with its energizing source, and deviation means to control the phase relation of the cycling potential and the condition unbalance when they are combined for joint control of the phase-sensitive means actuating the means controlling the variable supply means.

4. A system for condition control including in combination, conditioning means for the system, a controller for the conditioning means, a power means responsive to system condition, a balanceable measuring bridge including a manually adjustable potentiometer and a potentiometer responsive to the power means, a deviation bridge responsive to the measuring bridge unbalance for selectively actuating two relays in accordance with the direction of the deviation, a modulating bridge producing a potential alternating between zero and a predetermined maximum with a constant phase relation relative to the energizing source of the system, a third relay whose circuit combines the output of the balanceable bridge and that of the modulating bridge through that relay of the deviation bridge which will place the balanceable bridge output 180° out of phase with the output of the modulating bridge, and means for bringing the controller under simultaneous direction of the combining third relay and the actuated relay of the deviation bridge.

5. An electric control network for a regulator maintaining a condition at a predetermined value by control of an agent varying the magnitude of the condition including in combination; a measuring network portion which produces an unbalance potential representative of the departure of the condition from a predetermined magnitude; two networks supplied the unbalance potential in parallel including, a first network selectively actuating two relays in accordance with the direction of deviation the condition departs from the predetermined magnitude, and a second network controlling an impulse relay by a composite potential formed by comparing a cycling potential with the measuring potential, the phase of the compared voltages always bucking by reason of the relay control exercised by the first network; and a circuit for controlling power applied to the regulator under directional control of the actuated relay of the first parallel network and under impulse control of the relay of the second parallel network.

6. A control system for a regulator maintaining a condition consisting of two factors of predetermined values including in combination; balanceable measuring networks for each factor arranged to sum their individual unbalances, one of the network's contribution being manually controllable by a shunting potentiometer, and each network having a manually adjustable set-point potentiometer; a balanceable deviation network, said network being subjected to the total measuring unbalance potential, the supply of said bridge being manually adjustable through a potentiometer, and said bridge actuating either of two relays in accordance with the direction it deviates from balance; a comparison network, said network actuating relay impulses of a length dependent upon the comparative values of a constantly cycling potential and the measuring voltage, said cycling potential maintained consistently 180° out of phase with the measuring voltage by the deviation relays, the maximum magnitude of the cycling potential being manually adjustable through a potentiometer, and the resistance of the network across which the measuring and cycling potential are compared being manually adjustable through a selective switch; and two circuits which are selectively arranged for completion by the deviation relays, pulsatingly actuated by the comparison relay, and arranged with a contact in each circuit controlled by a relay in the other so the circuit not actuated by the deviation relay will be broken upon actuation of the other circuit while simultaneously controlling the condition regulator.

7. An electric network for producing a cyclic potential of selective phase including in combination, an energized device with a movable element varying the magnitude of the potential output while maintaining a constant phase relation with the energizing source, means for reciprocating the element at a constant rate, a center-tapped resistance across which the output potential of the device is placed, an element resistance with one end permanently joined to the center tap, contact-controlled connections between the ends of the center tap resistance, a relay for each contact, and means for selective energization of the relays in accordance with the phase of the demand for the potential across the single resistance.

8. The network of claim 7 in which a potentiometer is arranged between the energized device and the center-tapped resistance for manual determination of the maximum magnitude of the potential output of the energized device.

9. The network of claim 7 in which the energized device is a movable core transformer whose movable core is the movable element reciprocated by a motor-controlled cam.

10. A system for comparing two electrical potentials including in combination, means for supplying a comparison circuit, a potential whose magnitude varies in accordance with the condition, a device for producing a potential which fluctuates regularly between a minimum and a maximum while maintaining a constant phase-relation with its energy source, a center-tapped resistance element across which the fluctuating potential is placed, a resistance in the comparative circuit which has one end connected to the center-tap and the other arranged through contacts for alternate connection with either end of the center-tap resistance, a balanceable first network responsive to the condition potential, means for selectively actuating the end contacts of the center-tap resistance in accordance with the direction of unbalance of the condition responsive network, and condition regulating means responsive to the potential of the comparative circuit.

11. The circuit of claim 10 in which the means for supplying the condition potential is a second balanceable network with the resistance responsive to the condition magnitude.

12. The system of claim 11 in which the fluctuating potential producer is a movable core transformer whose core is reciprocated by a motor controlled cam in a predetermined pattern.

13. The system of claim 12 in which means are provided for manual adjustment of the maximum value of the fluctuating potential, the set point of condition potential, the energization of a first balanceable network, and the value of the resistance in the comparative circuit.

References Cited in the file of this patent

UNITED STATES PATENTS

| | | |
|---|---|---|
| 1,959,803 | Wittkuhns | May 22, 1934 |
| 2,331,138 | Ryder | Oct. 5, 1943 |
| 2,367,746 | Williams, Jr. | Jan. 23, 1945 |
| 2,432,036 | Noxon | Dec. 2, 1947 |
| 2,524,665 | Hornfeck | Oct. 3, 1950 |
| 2,598,236 | Dickey et al. | May 27, 1952 |
| 2,666,171 | Williams | Jan. 12, 1954 |